Figure 1:
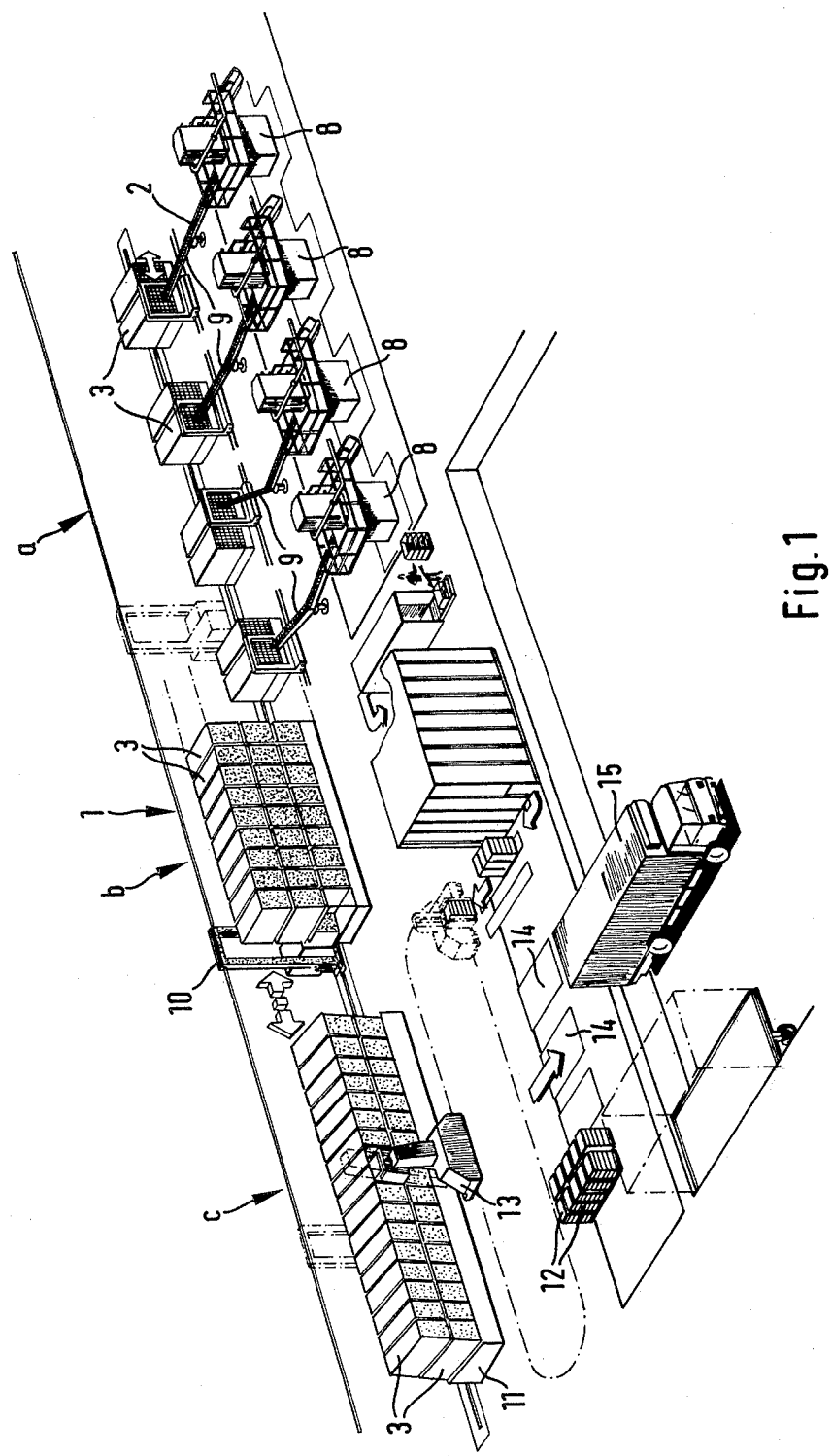

United States Patent [19]

Stolt et al.

[11] 4,247,245
[45] Jan. 27, 1981

[54] METHOD FOR STORING AND TRANSPORTING MIXED CARGO

[75] Inventors: Nils L. Stolt; Gösta Bengtsson, both of Lund, Sweden; Walter Krieg, Brugg, Switzerland

[73] Assignee: Alfa-Laval AB, Tumba, Sweden

[21] Appl. No.: 896,089

[22] Filed: Apr. 13, 1978

[30] Foreign Application Priority Data

Apr. 18, 1977 [DE] Fed. Rep. of Germany ....... 2717011

[51] Int. Cl.³ .................................. B65B 35/00
[52] U.S. Cl. ............................. 414/786; 53/246; 220/1.5; 312/236; 414/331; 414/404; 414/425
[58] Field of Search ............. 414/266, 267, 331, 403, 414/404, 425, 276, 786; 220/1.5, 20, 21; 206/429, 433, 446, 591–594, 814; 53/127, 246; 312/236

[56] References Cited

U.S. PATENT DOCUMENTS

| | | | |
|---|---|---|---|
| 2,605,912 | 8/1952 | Small et al. | 414/331 |
| 2,679,323 | 5/1954 | Patterson | 414/331 |
| 3,064,783 | 11/1962 | McClelland | 193/38 |
| 3,499,694 | 3/1970 | Coppel | 220/1.5 |
| 3,754,671 | 8/1973 | Walda | 414/331 |
| 4,087,142 | 5/1978 | Aumack | 312/236 |

*Primary Examiner*—Robert G. Sheridan
*Attorney, Agent, or Firm*—Blanchard, Flynn, Thiel, Boutell & Tanis

[57] ABSTRACT

An apparatus for storing mixed cargo in which a plurality of containers each house therein a plurality of storage channels arranged in tiers and rows filling each container and located immovably with respect to each other. The storage channels lead away from a loading and unloading opening in one container end wall. Each channel has a smooth, low friction bottom extending in its longitudinal direction. Packages are loaded through the loading and unloading opening one in back of the other in series in each channel. The channels are loaded by pushing items of cargo in mutual contact into the channels and by tilting the container to allow sliding of the items of cargo in rows out of the channels. In a plant the containers are loaded at a loading station, transported to a storing station where they are oriented with their loading openings facing in the same direction, for convenient refrigeration of the contents, and at a third station items of cargo are transferred from such a multichannel container directly to correspondingly located channels of an opposed distribution container.

8 Claims, 7 Drawing Figures

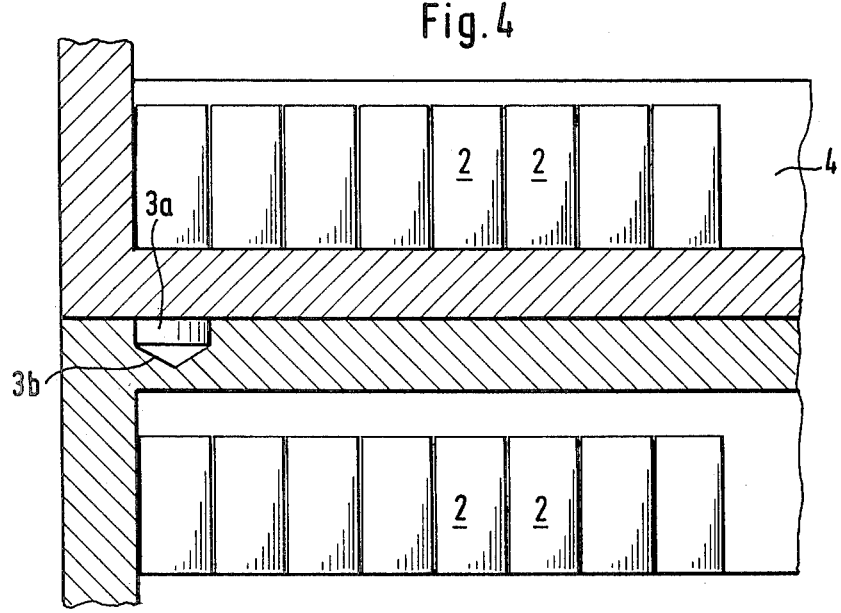
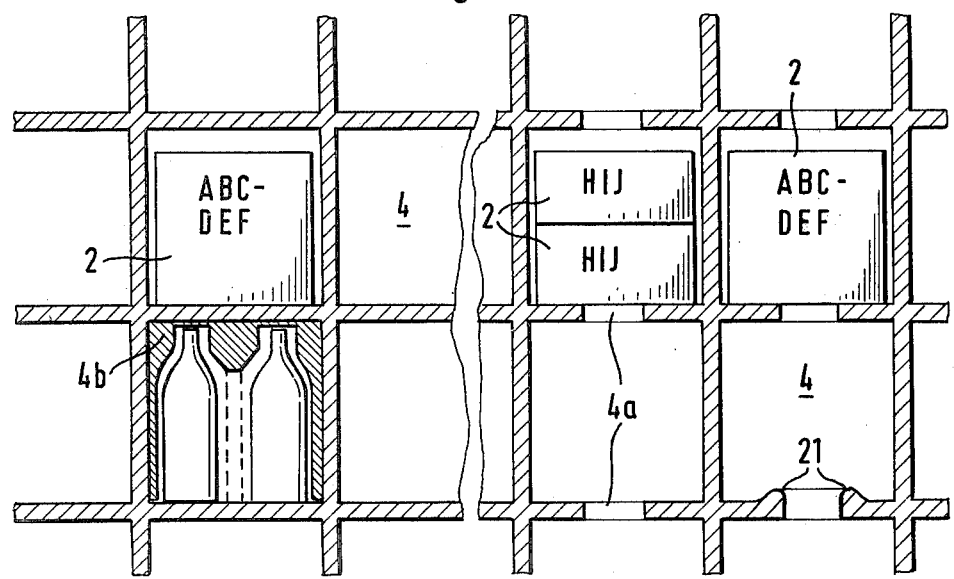

METHOD FOR STORING AND TRANSPORTING MIXED CARGO

This invention relates to an apparatus for storing mixed cargo, especially packages, comprising a plurality of containers each receiving a plurality of packages which include a loading and unloading opening on one container end wall and a support and storage structure in the interior thereof for receiving said mixed cargo.

An apparatus of this type is already known from British Pat. No. 1,279,646 in which the containers are designed in the form of an upright cabinet and are provided on their lower sides with rollers so that they may be moved in an upright position. Each cabinet has on its upper side inlet and discharge lines adapted to be connected to a central source of coolant or refrigerant. In the interior of this cabinet shelves extending the width of the cabinet and arranged above one another with a considerable spacing therebetween are provided for receiving the pieces of mixed cargo. The front side of the cabinet which is open per se is adapted to be closed by a swinging door as is common in such refrigeration cabinets.

Such cabinet-like containers must be filled and emptied by hand. Furthermore, they have a relatively limited capacity and cannot be combined to form a voluminous temporary storage because they can only be positioned next to one another.

The object of the invention is to develop an apparatus of the type cited at the outset in such a way that it employs simple means and is suitable for trouble-free large-scale use with mechanical loading and unloading.

This object is accomplished in accordance with the invention by an apparatus of the type described at the outset in which each container is equipped with a plurality of rows of tiered storage channels which lead fom said loading and unloading opening horizontally into the interior of said container, each of which accommodates a plurality of pieces of mixed cargo arranged in a row in back of one another and each of which has a low-friction bottom extending longitudinally for trouble-free unloading without separate transport devices when said containers are tipped toward the loading and unloading opening.

Storage channels are provided in the inventive apparatus which are advantageously arranged in rows next to one another and, within each of these rows, are tiered above one another. The result, when seen in cross section, is the picture of a raster or grid pattern. The channels extend horizontally from the loading and unloading opening into the interior of the container.

If such apparatuses are supposed to store mixed cargo which is to be refrigerated, such as milk boxes or bottles, the containers then being designed with thermal insulation in a manner known per se, the invention provides that the loading and unloading opening is designed to connect to a wall which prevents the access of heat and which if desired includes apertures communicating with a source of cool air.

The invention is based on the fundamental concept that in such devices designed for large-scale oeration the loading and unloading of the containers must be possible mechanically without the containers themselves being provided with any transport means. This would detrimentally complicate the design and construction of the containers, would restrict considerably their capacity and would result in disruptions during loading and unloading.

Within the scope and framework of this concept, the invention provides for a method for manipulating such an apparatus in such a manner that the pieces of mixed cargo remain in mutual contact both when being loaded into the storage channels as well as when being unloaded from the same, whereby when the storage channels are loaded, the pieces of mixed cargo are pushed in rows into the storage channels by an external forces, whereas when they are unloaded, the container is tipped and the pieces of mixed cargo automatically slide out of the storage channels in rows due to the force of gravity.

Thus although the active forces are effective outside the container during loading and unloading, the invention still succeeds in achieving a completely controlled loading and unloading of the pieces of mixed cargo because they always remain in mutual contact with each other so that by acting on the frontmost package located adjacent the loading and unloading opening the packages in the row behind it inside the storage channel can be controlled as well.

Each container is thus loaded and unloaded according to the "first-in/last-out" system, since each storage channel is open only on the front side and the package which is pushed into such a storage channel as the first one is the last to leave it again during unloading.

In order for the containers to be employed in a space-saving manner during large-scale operations, for example, as temporary or final storage containers, the invention provides that the containers are designed to be stacked in tiers above one another in order to store them and they are equipped with guide blocks and guide block holes which engage each other when in the appropriate position.

By virtue of these measures, the containers can be arranged in high stacks and may even assume a forwardly tipped position because the meshing guide blocks and guide block holes reliably hold the containers even in such an inclined position so that not only every arbitrary container along the entire front side of such a stack of containers, for example, is ready for immediate unloading, but even that every arbitrary storage channel can be unloaded by itself as desired.

So that the force of gravity will still be adequate when the containers are tipped at only a relatively small angle, each storage channel is equipped with low-friction boundary walls which keep the mixed cargo in position. It is also very advantageous if the bottom of each storage channel has a slot in its longitudinal direction, the bottom being provided with continuous friction-reducing beads adjacent to the slot edges.

The measure of dividing the base of each storage channel in its longitudinal direction by means of a slot results in yet another advantage, i.e. that .n this way the width of the storage channel can be varied by simply pushing together or pulling apart the wedge-type bottoms secured to the vertical walls.

It is also especially advantageous in this context if the support and storage structure which is designed as the storage channels is mounted in the container in an interchangeable manner.

Such a measure allows every container to be rapidly converted for another different type of package.

It is also possible in accordance with the invention that guide inserts adapted to the shape of the mixed cargo, e.g. bottles, are provided inside the storage channels.

In this way the containers can be very quickly converted to receive sensitive pieces of mixed cargo which have a special shape.

An essential prerequisite for the simple and easy manipulation of the containers in large-scale operation is seen in the fact that the containers, after the storage channels have been filled, are moved in line, i.e. without being rotated about their own axes, to the intermediate refrigeration or to the storage stack. Such transport of the container also makes it possible to maneuver the containers for temporary refrigeration so that the front end with the loading and unloading opening is positioned at a wall-like refrigerant outlet device or to combine the containers during unloading or in the intermediate storage to form a stack in which all containers are then accessible from the same side.

Figure 2:
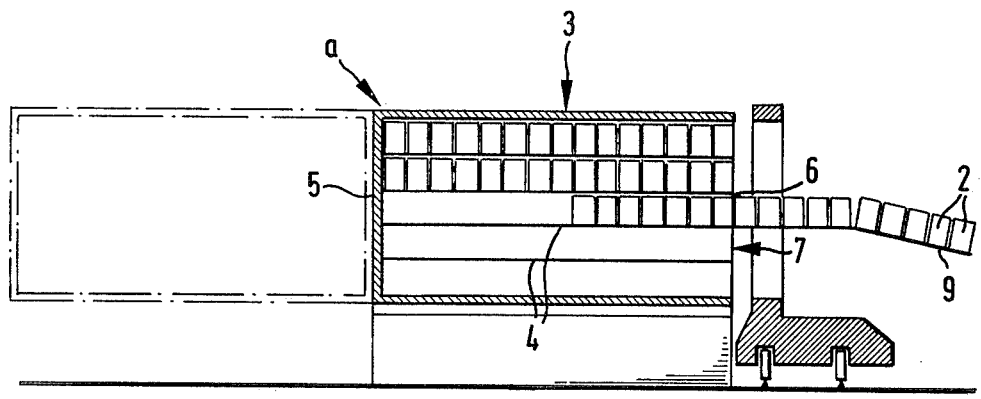
Figure 3:
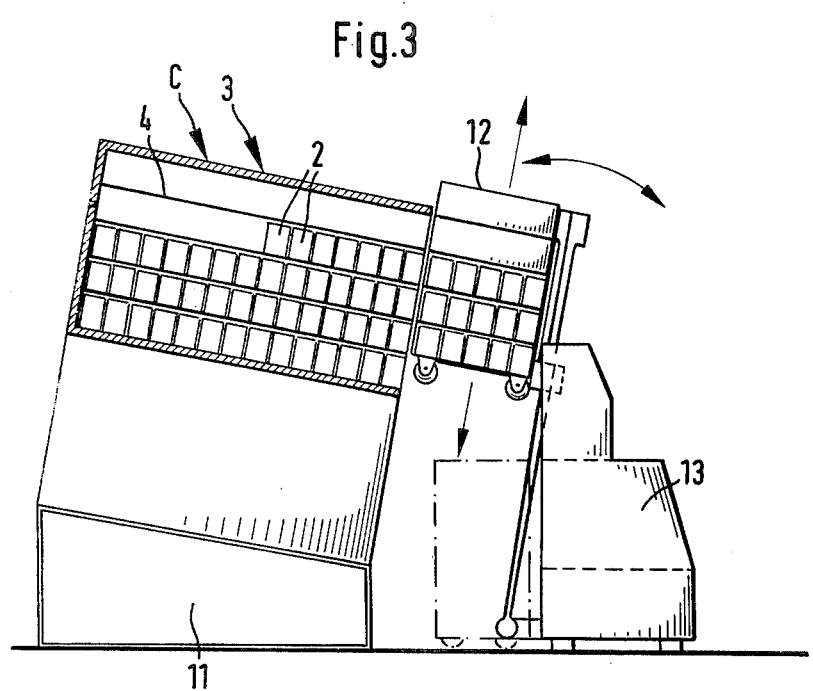
Figure 6:
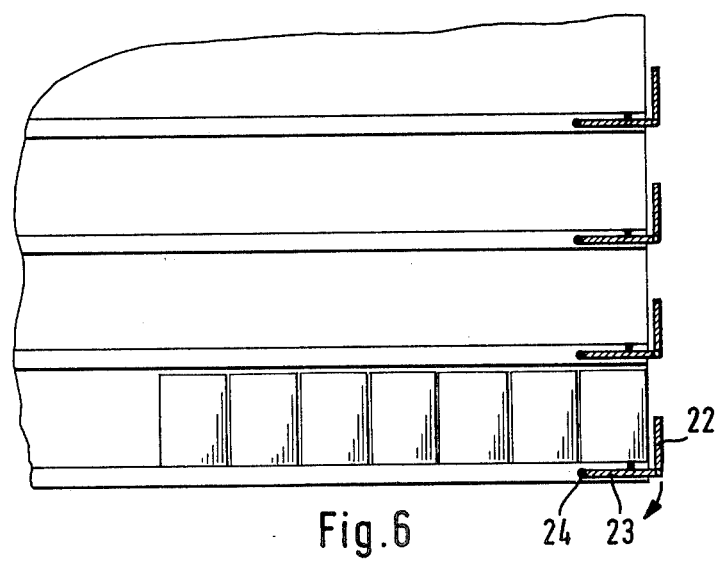
Figure 7:
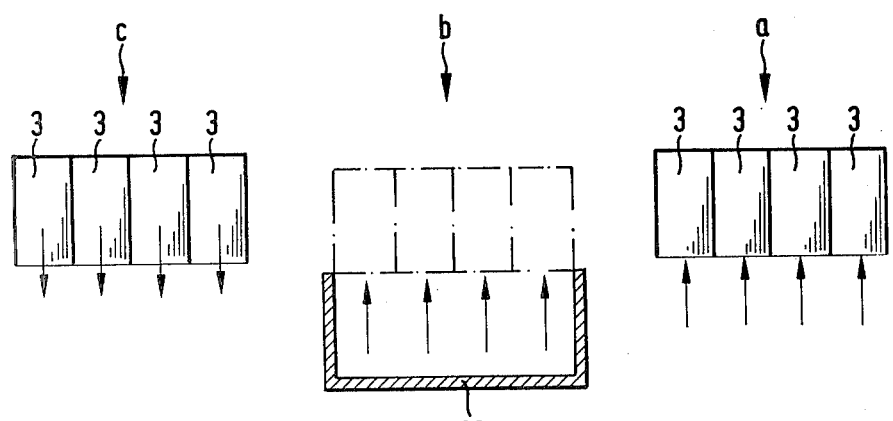

Embodiments of this inventive concept are illustrated and explained in the drawing, in which:

FIG. 1 is a perspective of the apparatus in conjunction with a plant for producing refrigerated milk, FIG. 2 is a longitudinal section through a container during loading, FIG. 3 is a longitudinal section through a container during unloading, FIG. 4 is a partial longitudinal section through two containers positioned above one another, FIG. 5 is a cross section through two support and storage structures featuring different designs, FIG. 6 is a stop means for the packages positioned on the open side of the storage channels, and FIG. 7 is a sketch of the transport path for the containers.

FIG. 1 illustrates a plant for producing and storing packaged and refrigerated milk. This plant includes a bottling and loading area a, a storage area b and an unloading and dispatch area c. An inventive apparatus 1 is provided in these areas for storing mixed cargo which must be kept cool, i.e. boxes of milk 2 in this case. This apparatus includes a plurality of insulated containers 3 which in the present case are arranged above and next to one another in a support frame (not shown) in the storage area b. A central refrigeration plant (not shown) is also integrated into the support frame, is illustrated schematically in FIG. 7 and is designated by number 20 throughout.

In the present case, the containers have the dimensions of an ISO freight container. As shown by FIGS. 1 and 3, they have in their interior a support and storage structure which is designed in the form of horizontal storage channels 4 and which serves to receive the mixed cargo, i.e. the boxes of milk. Each storage channel extends horizontally from the loading and unloading opening at the front side 6 into the interior and is provided with a smooth bottom.

Two constructions of the support and storage structure are shown in FIG. 5. The illustration on the left illustrates storage channels 4 which are closed on all sides and which have smooth boundary walls, e.g. metal or plastic, on all sides. The illustration on the right shows a support and storage structure in which the bottom has in each case a longitudinal slot 4a which extends longitudinally in the middle of the channels. In one of the storage channels the base is provided in the area of the slot with two continuous longitudinal beads 21 so that the friction between the packages and the associated bottom is reduced considerably. The slots 4a also ensure a uniform distribution of refrigerated air when the containers 3 are connected to the central source of cool air. Moreover, the continuous vertical walls with the bottom segments located thereon can be separated to a greater or lesser extent so as to adapt to the different widths of the packages.

Both support and storage structures can be removed entirely from the containers for the purpose of cleaning and replacement. They can have an integral construction. FIG. 5 also shows packages 2 which are arranged in the storage channels on end, for example. The embodiment on the right also illustrates the case where two packages are located above one another in one storage channel.

Furthermore, a solution is shown in the lower left corner in which a guide insert 4b has been inserted into a storage channel for receiving bottles therein. The insert is shaped such that it has a profile form which is continuous throughout the channels in the longitudinal direction and which is adapted to the cross-sectional shape of one or two and more bottles. The bottles can therefore be arranged in rows in back of one another in the storage channels exactly like the packages 2.

As the drawing reveals, especially FIGS. 2 and 3, the configuration of the rectangular, cuboidal containers 3 is such that the storage channels extend longitudinally with respect to the containers, thereby resulting in a large capacity for each storge channel. The containers are accessible solely from the front side 6, i.e. the containers can be loaded and unloaded only from the front side 6.

The containers 3 have a self-supporting construction and can be stacked above one another as shown in the unloading area c. In order to obtain a stable arrangement when stacking the containers upon one another, the invention provides for equipping the containers with mutually engaging guide blocks 3a and guide block holes 3b as shown in FIG. 4. In this way a positive connection is formed so that the containers are reliably interconnected even when tipped into the forward inclined position (see FIG. 3).

In the loading and bottling area a, the milk boxes 2 from the bottling stations 8 are positioned and moved into the individual storage channels 4 of the waiting containers 3 with the aid of a conveyor belt 9 which utilizes a pushing force. The entire front side of a container is open for the loading operation in the present case. It is also possible for only those openings of a storage channel to be loaded to be open. As soon as a container is loaded completely, it is transported with the aid of a container conveyor 10 from the loading area a into the storage area b. At the same time, the loading of another container 3 originally located in a stand-by position adjacent to the container just transported away then begins.

The container 3 just conveyed to the storage area b is positioned in the support frame and is connected to the central refrigeration plant 20.

In order to ship the boxes of milk, the number of containers corresponding to the daily requirements is transported from the storage area b into the unloading and dispatch area c by the container conveyor 10. In the latter area, those containers are stacked upon one another or inserted into a support frame (not shown) whose contents are to be dispatched. FIG. 3 shows that in the unloading area the containers rest on an inclined support surface 11. When filling the individual orders from the clients, the containers in the present case are emptied and the milk located therein are transferred to smaller containers 12 which can then remain at the client's shop or store until the goods have been sold. The milk boxes are transferred from the containers 3 to the small containers 12 with the aid of a removal device 13 which in each case moves a small container up to the front side of the container 3 to be unloaded, whereupon the milk boxes slide automatically from the container 3 into the smaller container 12 due to the inclination once the respective opening of the storage channel has been made accessible. While the boxes are sliding from container 3 into container 12 and in order to ensure that the boxes will follow closely behind one another and will remain in direct contact with one another, it can also be provided that the sliding surfaces of container 12 are somewhat rougher than those in container 3. A certain "back-up" effect is obtained in this manner by virtue of which the packages will always remain in contact with one another during their sliding movement. FIG. 1 reveals that the small container 12 which is subsequently filled can be moved, after being placed on the platforms 14, onto track and lorry vehicles 15 for transport to the ultimate destination.

It is also possible, however, to arrange the containers themselves at the shops or stores in such a way that the goods are sold directly from the containers, thereby omitting the transfer of the mixed cargo from the containers into smaller containers.

When reference has been made to the horizontal position of the storage channels, this has been understood to mean the position of the storage channels when the position of the containers is also horizontal. Hence, if the containers are inclined or tipped, the storage channels are necessarily inclined or tipped to the same extent, since they are disposed in the interior of the containers and must execute the same movement as these.

This is important for unloading the containers, an operation which is also carried out without any conveyor means located inside the container, i.e. solely by utilizing the force of gravity of the packages.

FIG. 6 shows how the packages are held in position in the storage channels. A stop means 22 is provided for this purpose adjacent to the open side of each storage channel and projects above the bottom level of the channel, but can also be pivoted downwardly out of the way when the channel is being unloaded. For this purpose, the stop means 22 includes an angular extension 23 which is pivoted about an axis 24 located on the bottom of the storage channel and is kept in the blocking position of the stop means 22 by means of a spring (not shown). The angular extension 23 may also have an elastically resilient design in order to accommodate the spring and the pivotal axis. The stop means 22 and the angular extension 23 are advantageously integral plastic structures. It is especially advantageous when the stop means 22 is located adjacent the slot 4a in the bottom of the storage channel.

It is also possible to provide such a mutual stop means in the form of a pivotal bar for each adjacent row of storage channels. In special cases, for example to pre- the temperature in the containers from rising excessively in a storage area, each container can be provided with a sliding or swinging door on the front side which constitutes the loading and unloading opening.

In exceptional cases, the storage containers could even be open on the second front side so that the storage channels could be unloaded by tipping the containers in the one or the other direction as desired.

FIG. 7 schematically shows how the containers 3 are moved "in line" after being loaded. They can be moved by means of the conveyor 10, for example, which can be moved longitudinally as shown by the arrows in FIG. 1, which can raise and lower the containers and which can move them perpendicular to the direction of longitudinal conveyor movement also. It is possible, for instance, to move the containers 3 into the compartments of the shelf located in storage area b. If no intermediate or temporary refrigeration is necessary there, the shelf can merely have a wall on the respective side against which the containers are pushed so that their open front sides are closed by said wall. In so doing, the wall can have a thermally insulated construction. In place of this wall, a refrigeration center can also be provided if temporary refrigeration of the packages in the container is necessary.

Moving the containers "in line" of course does not mean that it is not possible to arrange areas c and/or b at an angle with respect to area a. The containers, however, should not be pivoted about their own vertical axis.

What is claimed is:

1. A method of handling within a plant several product units of different kinds, which are to be distributed to different places outside the plant, comprising:
   loading the product units through a loading opening in a storing container into parallel storage channels located in a plurality of rows and tiers in said container, which channels lead from said loading opening horizontally into the interior of the storing container;
   transporting said storing containers from the place, where they are loaded with product units, to a storing place where they are oriented with their loading openings all facing in the same direction;
   transporting to said storing place distribution containers which are equipped with loading openings and parallel channels of the same kind as the loading openings and channels of the storing containers, and placing said distribution containers with their loading openings opposite to certain channel openings of the storing containers;
   transferring the product units from channels of the storing containers into aligned channels of the distribution containers; and
   thereafter transporting said distribution containers out of the plant.

2. The method of claim 1 in which said step of transporting said storing containers to said storing place includes the steps of transporting said storing containers from the place they are loaded with product units to an intermediate place, temporarily leaving said storing containers in said intermediate place, and thereafter transporting said storing containers from said intermediate place to said storing place.

3. The method of claim 2 in which said step of transporting said storing containers to said intermediate place includes moving said container from its position of said loading step in line and without rotation about its own axis to said intermediate place.

4. The method of claim 1 in which said step of transporting said storing containers from the place where they are loaded to said storing place is carried out by moving each storing container from its position of said loading step in line and without rotation about its own axis to said storing place.

5. The method of claim 1 in which said step of transporting said storing containers to said storing place includes placing said storing containers on an inclined support surface at said storing place, the inclination of said support surface being toward said same direction.

6. The method of claim 1 in which prior to said loading step, a support storage structure is removably inserted in the interior of said container and fills said container with said storage channels arranged in said tiers and rows, said support storage structure of each storing container constituting a gridlike array of shelves and partitions constituting the top, bottom and side walls of the storage channels, said gridlike array of shelves and partitions in each container being an integral unit removable in one piece from the container, as for cleaning.

7. The method of claim 1 including, prior to said loading step, providing said storage channel each with a slot in its longitudinal direction and permitting circulation of air vertically from one channel to the next through said slots in the bottoms of the successively stacked storage channels.

8. The method of claim 1 including providing said storage channels with bottom walls and side walls of smooth low friction material and thereby facilitating sliding of cargo lengthwise in each storge channel while limiting movement of each cargo item transverse of the longitudinal axis of its storage channel.

* * * * *